(No Model.)
D. HUTCHINSON.
REIN HOOK.
No. 310,589. Patented Jan. 13, 1885.
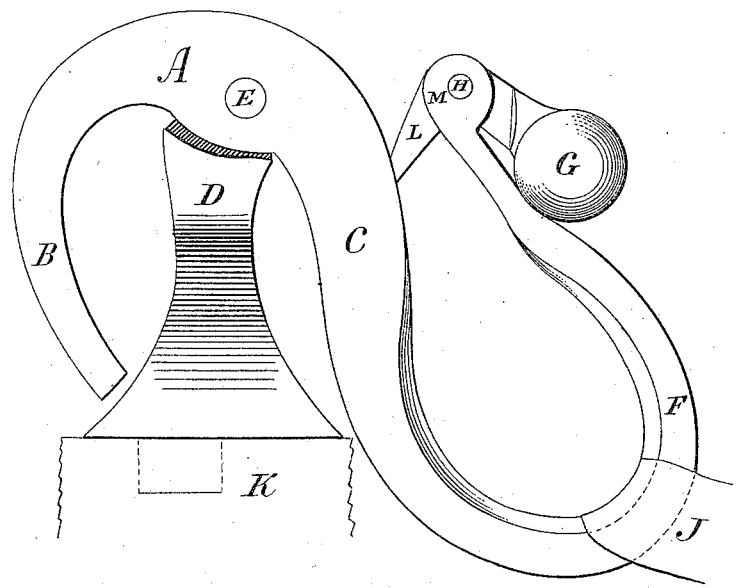
Witnesses
O. W. Walker
S. L. Drake
Inventor.
Daniel Hutchinson
by Hutchinson Bros.
Attys.

UNITED STATES PATENT OFFICE.

DANIEL HUTCHINSON, OF LYNN, MASSACHUSETTS, ASSIGNOR TO THE AMERICAN REIN HOOK COMPANY, OF NASHUA, NEW HAMPSHIRE.

REIN-HOOK.

SPECIFICATION forming part of Letters Patent No. 310,589, dated January 13, 1885.

Application filed August 12, 1884. (No model.)

*To all whom it may concern:*

Be it known that I, DANIEL HUTCHINSON, a citizen of the United States, residing at Lynn, in the county of Essex and Commonwealth of Massachusetts, have invented a new and useful Rein-Hook, of which the following is a specification.

The objects of my improvements are, first, to prevent the accidental removal of the check-rein; second, to prevent the saddle from tipping forward and causing the horse's back to become sore. I attain these objects by means of the mechanism illustrated in the accompanying drawing, which is a side view of the entire device.

The hook consists of three pieces—viz., the standard D, the curved piece A B C F, and the ball G, with the bent projection L. The standard D is made to project into the curved piece A B C F, forming a joint at the part A, so that the curved piece turns on the pin E.

By means of the above-described mechanism when the rein J is tightened, it causes the curved part of the hook A B C F to turn on the pin E, and the back part of the hook B to bear upon the back of the standard D, thus preventing the saddle K from tipping forward. The front part of the hook F is enlarged and split at the part M, and the ball G, with the projection L, is hung in the orifice, and turns on the pin H. The projection L extends across the opening of the hook, and is held in position by the ball G, on the opposite side of the pin H, so that when the rein J is inserted in the hook the projection L is depressed and the ball G raised. When the rein J is passed below the projection L, the ball G drops back upon the front of the hook F, and the projection L resumes its position across the opening of the hook.

To remove the rein J, the ball G must be raised, thus depressing the projection L, and leaving the opening of the hook clear.

The hook is attached to the saddle by a screw or bolt on the underside of the standard D, as in ordinary rein-hooks.

Having fully described my invention, what I desire to claim and secure by Letters Patent, is—

1. The combination, in a rein-hook, of the hook A B C F, with the ball G, projection L, and pin H, substantially as described.

2. A rein-hook having the hook A B C F, standard D, pin E, ball G, pin H, and projection L, arranged substantially as in the one shown and described.

DANIEL HUTCHINSON.

Witnesses:
SPENCER L. DRAKE,
WARREN B. HUTCHINSON.